(12) United States Patent
Kisono

(10) Patent No.: US 6,906,829 B1
(45) Date of Patent: Jun. 14, 2005

(54) APPARATUS AND METHOD OF PERFORMING A FACSIMILE TRANSMISSION THROUGH LOCAL AREA NETWORK

(75) Inventor: Masahiro Kisono, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/316,908

(22) Filed: May 5, 1999

(30) Foreign Application Priority Data

May 6, 1998 (JP) .......................................... 10-123051

(51) Int. Cl.[7] ............................ G06F 15/00; H04N 1/00
(52) U.S. Cl. ...................... 358/407; 358/1.15; 358/403; 358/434; 379/100.09; 379/100.12
(58) Field of Search ................................ 358/1.15, 402, 358/403, 407, 434, 442, 443, 444, 468; 379/100.01, 100.08, 100.09, 100.11, 100.12, 100.15; 709/217, 218, 238, 239, 240, 242, 244

(56) References Cited

U.S. PATENT DOCUMENTS

| 5,517,324 A | * | 5/1996 | Fite, Jr. et al. ............. 358/434 |
| 5,621,894 A | * | 4/1997 | Menezes et al. ............. 709/227 |
| 5,828,836 A | * | 10/1998 | Westwick et al. ........... 709/200 |
| 5,987,508 A | * | 11/1999 | Agraharam et al. ........ 709/217 |
| 6,005,677 A | * | 12/1999 | Suzuki ....................... 358/442 |
| 6,384,927 B1 | * | 5/2002 | Mori .......................... 358/1.15 |
| 6,633,630 B1 | * | 10/2003 | Owens et al. ............. 379/93.24 |

* cited by examiner

Primary Examiner—Joseph R. Pokrzywa
(74) Attorney, Agent, or Firm—Cooper & Dunham LLP

(57) ABSTRACT

A method of transmitting an information transfer request from a client data terminal which is coupled to a local area network to a called data terminal which is coupled to the local area network and a public switched telephone network includes the steps of collecting, storing, generating, creating, sending, and transmitting. The collecting step collects information sets of communication capabilities of different data terminals on the local area network on the client data terminal. The storing step stores the information sets into a memory. On the client data terminal, the generating step generates data of facsimile image information with reference to one of the information sets pertaining to the called data terminal. The creating step creates on the client data terminal an information transfer request for requesting transmission of the facsimile image information to an arbitrary facsimile machine connected to the public switched telephone network. The sending step sends the information transfer request from the client data terminal to a communications controller. The transmitting step transmits the information transfer request from the communications controller to the called data terminal through the local area network upon a completion of the sending step.

20 Claims, 16 Drawing Sheets

Fig. 9

| CALLING TELEPHONE NO. || LOCAL ID |
|---|---|---|
| IMAGE PROPERTY HEADER |||
| RECORDING SHEET SIZE | ENCODING/ DECODING METHOD | RESOLUTION |
| IMAGE DATA |||

APPARATUS AND METHOD OF PERFORMING A FACSIMILE TRANSMISSION THROUGH LOCAL AREA NETWORK

BACKGROUND

1. Field

The disclosed system and method relates to a data terminal apparatus, and more particularly to a data terminal apparatus which is capable of performing a facsimile transmission operation through a local area network.

2. Description of the Related Arts

There has been developed a data terminal apparatus which is capable of transmitting facsimile image information to a facsimile machine which is connected to a public switched telephone network (PSTN), via a so-called network facsimile machine. The network facsimile machine is capable of exchanging information such as electronic mail with other data terminals via a local area network and the Internet, as well as exchanging facsimile data with other facsimile machines via the PSTN.

One way for transferring facsimile image information from a data terminal to an arbitrary facsimile machine which is connected to the PSTN is to send an information transfer request to the network facsimile machine using the electronic mail. However, the electronic mail may be inferior in an aspect of immediacy of transmitting information since the local area network normally employs a mail server system in which the electronic mail is transferred to another data terminal, including the network facsimile machine, via a mail server.

If a facsimile application which is included in the data terminal apparatus is configured to activate and to use a facsimile modem of the network facsimile machine as if using a facsimile modem of the data terminal apparatus, the immediacy of transmitting information may be greatly increased. In this case, the facsimile application software of the data terminal apparatus carries out the communications operation with the network facsimile machine through the local area network. Accordingly, delay times between commands in accordance with Group 3 facsimile communications procedure and responsive signals corresponding to the commands may be unstable due to a varying amount of local area network traffic. The delay time that exceeds a predetermined allowable time period may cause an error of the facsimile application software.

However, these system do not allow users to perform a facsimile transmission operation from a data terminal apparatus to a network facsimile machine via a local area network with an increased immediacy of transmitting information and without causing a communications error.

SUMMARY

The present application provides a method of transmitting an information transfer request from a client data terminal which is coupled to a local area network to a called data terminal which is coupled to the local area network and a public switched telephone network. In one embodiment, the method includes the steps of collecting, storing, generating, creating, sending, and transmitting. The collecting step collects information sets of communication capabilities of a plurality of different data terminals on the local area network at an arbitrary time on the client data terminal. The called data terminal is included in the different data terminals, and each of the different data terminals is coupled to the local area network and the public switched telephone network and including. The storing step stores the information sets of communication capabilities into a memory. On the client data terminal, the generating step generates data of facsimile image information with reference to one of the information sets of communication capabilities pertaining to the called data terminal. The creating step creates on the client data terminal an information transfer request for requesting transmission of the facsimile image information to an arbitrary facsimile machine connected to the public switched telephone network. The sending step sends the information transfer request from the client data terminal to a communications controller. The transmitting step transmits the information transfer request from the communications controller to the called data terminal through the local area network upon a completion of the sending step.

The information transfer request may include information of a telephone number of the arbitrary facsimile machine, the data of facsimile image information to be transferred, property information of the facsimile image information, and identification information identifying the called data terminal.

Each of the information sets of communication capabilities of the registered different data terminals collected in the collecting step may include information of at least a connection for specifying one of the registered different data terminals, an image resolution, a recording sheet size, encoding/decoding functions.

The steps of judging and converting may be included. The judging step may judges whether the information transfer request received by the communications controller has been encoded using an encoding function is low-graded than the registered encoding/decoding functions. The converting step converts the information transfer request sent using the encoding/decoding functions registered in the memory during the storing step when a result of the judging step determines that the encoding function used in the conversion of the information transfer request is low-graded than the registered encoding/decoding functions.

The communications controller may have a default condition in which the communications controller is normally conditioned to send information transfer request to a specific data terminal from among the different data terminals registered in the memory, and can be released from the default condition and be set to other different data terminal when the client data terminal specifies other called data terminal to send the information transfer request.

The present invention further provides a client data terminal which is coupled to a local area network includes a first communications device, a memory, and a second communications device. The first communications device generates data of facsimile image information with reference to information of communication capabilities of a called data terminal to which the first communications device requests to send such data of facsimile image information and then performs a standard facsimile communications operation with respect to an information transfer request for requesting a transmission of the facsimile image information to an arbitrary facsimile machine connected to a public switched telephone network. The called data terminal is one of a plurality of different data terminals coupled to the local area network and the public switched telephone network. The second communications device performs at an arbitrary time the standard communications operation with at least one of the plurality of different data terminals to receive information sets of communication capabilities of the at least one of the plurality of different data terminals and stores such information into the memory. The second communications device further performs the standard facsimile communications operation with the first communications device to send from the memory one of the information sets of communication capabilities which pertain to the called data terminal. Further, the second communications device performs the standard facsimile communications operation with the first communications device to receive the information transfer request. Also, the second communications device performs the standard facsimile communications operation, using the information transfer request received from the first communications device, with the called data terminal through the local area network after completing the standard facsimile communications operation with the first communications device. The second communications device is operatively connected to the first communications device and to the plurality of different data terminals via the local area network.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 9 is an illustration for explaining the contents of information included in a facsimile image generated by a facsimile application manager of FIG. 5;

DETAILED DESCRIPTION

Figure 1:
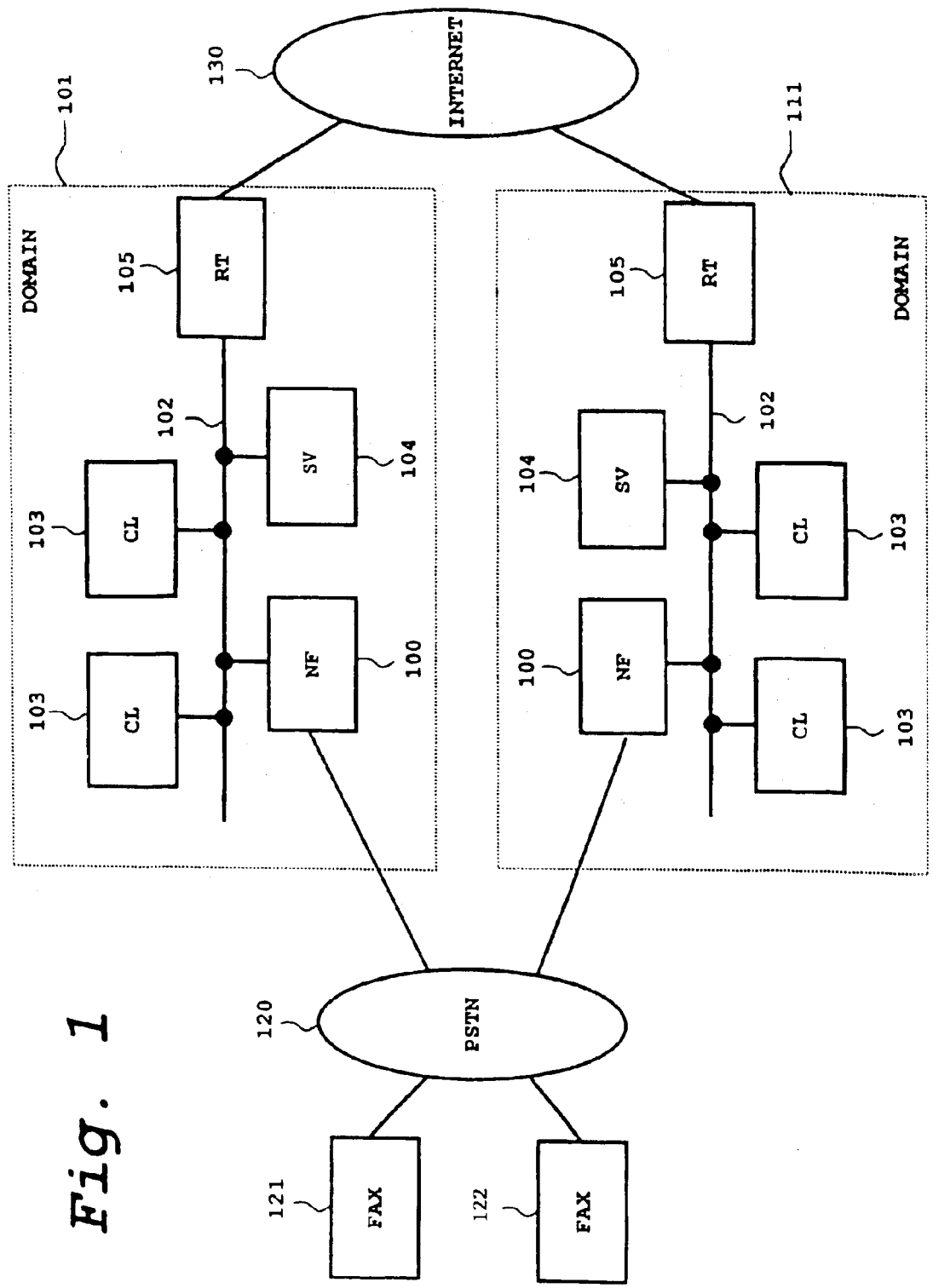
FIG. 1 is a block diagram of an electronic communications system including a client terminal apparatus and a network facsimile apparatus according to a first embodiment of the present invention.

In describing preferred embodiments of the present invention illustrated in the drawings, specific terminology is employed. However, the application is not intended to be limited to the specific terminology so selected and it is to be understood that each specific element includes all technical equivalents which operate in a similar manner.

Referring now to the drawings, wherein like reference numerals designate identical or corresponding parts throughout the several views, FIG. 1 illustrates an exemplary electronic communications system including an exemplary network facsimile apparatus (NF) 100. The electronic communications system of FIG. 1 includes various types of electronic communications networks such as a domain (DM) 101, a domain (DM) 111, a public switched telephone network (PSTN) 120, the Internet 130, and possibly other networks which are not specifically illustrated.

The DM 101 includes a local area network (LAN) 102 that connects various devices, including the above-mentioned network facsimile apparatus 100, a plurality of client terminals (CL) 103, a mail server (SV) 104, and a router (RT) 105, and that allows communications between the various devices. The DM 111 is similarly configured to that of the DM 101 for the sake of simplicity. The PSTN 120 connects a plurality of communications terminals including Group 3 facsimile machines (FAX) 121 and 122 to allow communications between these terminals. The Internet 130 connects a plurality of domains (DMs), including the DMs 101 and 111, and allows communications between the domains.

In each of the DMs 101 and 111, the network facsimile apparatus 100 is connected to the LAN 102 and the PSTN 120 to function as a gateway to both networks. The RT 105 is connected to the LAN 102 and the Internet 130 to function as another gateway to these networks. With these connections, each of the LANs 102 has a connection to the plurality of communications terminals including the FAXs 121 and 122 through the PSTN 120 and to the plurality of domains through the Internet 130. Preferably, each of the FAXs 121 and 122 transmits and receives image information through a Group 3 facsimile communications procedure.

Each of the DMs 101 and 111 has an individual domain identification. Each of the DMs 101 and 111, the network facsimile apparatus 100, each of the CLs 103, and the SV 104 is given an individual network address, usually based on its individual address information coupled with the corresponding domain identification. A user who uses a client terminal in the DM 101 is provided with an individual user address which is usually based on the user's individual name coupled with the above-mentioned individual network address of the client terminal. Such an individual user address that is generally made of alphanumeric symbols including alphabetical characters is referred to as an electronic mail (E-mail) address. Using these network addresses and E-mail addresses, communications are carried out between terminals including the CLs 103 and the network facsimile apparatus 100 within a domain and between domains through the Internet 130.

The network facsimile apparatus 100 has various functions related to electronic mail (E-mail), including an E-mail function for sending and receiving E-mail containing image information to and from other terminal machines through the LAN 102. The network facsimile apparatus 100 also has general facsimile functions including a Group 3 facsimile communications capability for transmitting and receiving facsimile image information to and from destination facsimile machines through the PSTN 120. Furthermore, the network facsimile apparatus 100 has a server function for providing-services in connection with a facsimile modem function thereof to the CLs 103 connected to the LAN 102.

Generally, a so-called protocol suite is applied for communications between machines connected to local area networks and via the Internet. In an operation of the protocol suite, a communication protocol, such as TCP/IP (transmission control protocol/Internet protocol) and another communication protocol are used in combination for up to a transport layer of an OSI (open systems interconnection), and for the layers higher than the transport layer, respectively. For example, an SMTP (simple mail transfer protocol) is used as a higher layer protocol for communications such as E-mail.

In each of the DMs 101 and 111, the LAN 102 employs a mail server system in which an incoming E-mail is first stored in the SV 104 and then sent to a destination client terminal. More specifically, when E-mail information reaches a domain, for example DM 101, the file server 104 checks a destination mail address attached to the E-mail and if the destination mail address is for a client terminal of that domain the mail server system of the domain stores the E-mail into the SV 104. When the E-mail has a destination mail address other than one controlled by the domain, the mail server system of the domain transmits the E-mail to the Internet 130 via the RT 105, and the E-mail is sent to another domain, e.g. the DM 111, to seek the destination terminal machine, or to a host machine that has an address corresponding to the destination mail address attached to the E-mail, through a data transmission function of the Internet 130.

In the above-described server system, at a certain interval the network facsimile apparatus 100 and the CLs 103 in each domain, e.g., DMs 101 and 111, request the SV 104 to check if an incoming E-mail addressed for a user of the requesting machine is stored therein. If an E-mail addressed to the user of the requesting machine is stored in the SV 104, the mail server system transmits the E-mail to the requesting machine. Upon receiving the E-mail, the requesting machine indicates to the user that there is an incoming E-mail. In the example being described, the network facsimile apparatus 100 has an E-mail address to exchange E-mails as described above. The protocol is a POP (post office protocol), for example, to be applied for the communications from the CLs 103 and the network facsimile apparatus 100 to the SV 104 to request the incoming check as described above.

In the example being described, each of the CLs 103 has various application software programs including programs that are usually used by one or more individual users on an exclusive basis. One exemplary program performs the Group 3 facsimile communications procedure to communicate with the network facsimile apparatus 100, for example, through the LAN 102. Another exemplary program exchanges various data such as E-mail with other terminals through the LAN 102. A further exemplary program processes facsimile image information included in E-mail that is sent from the network facsimile 100. That is, when a user sees an indication of an E-mail arrival, the user may open the E-mail to check the contents. If the contents include binary data such as facsimile image information, the user can initiate a program that can handle the binary data in an appropriate manner so as to see the contents. Typically, to review the binary data in E-mail, the data is first transferred into a different data format such as a MIME (multi-purpose Internet mail extensions) format.

The above-mentioned communication protocols, such as the TCP/IP, SMTP, and POP, as well as the data format and structure of the E-mail, including the MIME, are defined in an RFC (request for comments) published by an IETF (Internet engineering task force). For example, the TCP and IP are defined in an RFC793, the SMTP in an RFC821, and the data format and structure of the E-mail in an RFC822, RFC1521, RFC1522, and RFC1468.

Next, an exemplary structure of the network facsimile apparatus 100 is explained with reference to FIG. 2. The network facsimile apparatus 100 includes a system controller 1, a system memory 2, a parameter memory 3, a clock circuit 4, a scanner 5, a printer 6, a display panel unit 7, an encoding/decoding unit 8, an image memory 9, a Group 3 facsimile modem 10, a network controller 11, a LAN (local area network) interface 12, a LAN (local area network) data transmission controller 13, and an internal bus 14.

The system controller 1 controls the operations of the network facsimile apparatus 100, including facsimile data transmission controls for transmitting and receiving image information and arbitrary data files. The system controller 1 includes a communications controller 1a, explained later. The system memory 2 stores control (or application) programs to be executed by the system controller 1 and corresponding data used when executing the control programs. In addition, the system memory 2 includes a working memory area reserved for use by the system controller 1. The parameter memory 3 stores various kinds of parameters and information specific to the network facsimile apparatus 100. The clock circuit 4 generates information of the present time.

The scanner 5 reads an image of a document at one of predetermined image reading resolutions. The printer 6 produces an image output at one of predetermined print resolutions. The display panel unit 7 includes various kinds of operational keys and indicators interfacing between an operator and the network facsimile apparatus 100.

The encoding/decoding unit 8 encodes image information to be transmitted to other facsimile terminals so that the information is compressed. The encoding/decoding unit 8 also decodes the compressed image information, which are transmitted from other facsimile terminals, back into original image information. The transmission data memory 9 stores a plurality of files of data including image data that are compressed and binary data.

The Group 3 facsimile modem 10 is preferably a Group 3 facsimile modem that performs the functions of a modem for the Group 3 facsimile machine. The facsimile modem 10 includes a low-speed modem function, such as a V.21 modem, for transmitting and receiving communication protocols and a high-speed modem function, such as V.17, V.34, V.29, V.27 ter modems, for mainly transmitting and receiving image information. The network controller 11 has direct connections to the Group 3 facsimile modem 10. The network controller 11 includes an automatic transmitting and receiving function and controls the connection of the network facsimile apparatus 100 to the PSTN 120.

The LAN interface 12 is a communication interface between the LAN data transmission controller 13 and the LAN 102 which is located in the same domain as the network facsimile apparatus 100. The LAN data transmission controller 13 controls communications, using a plurality of predetermined protocol suites, for exchanging various kinds of data with other devices associated with the same domain as the network facsimile apparatus 100, e.g., DM 101, via the LAN 102. The controller 13 can also control communications for exchanging various kinds of data with data terminal machines associated with other domains via the Internet 130.

Figure 2:
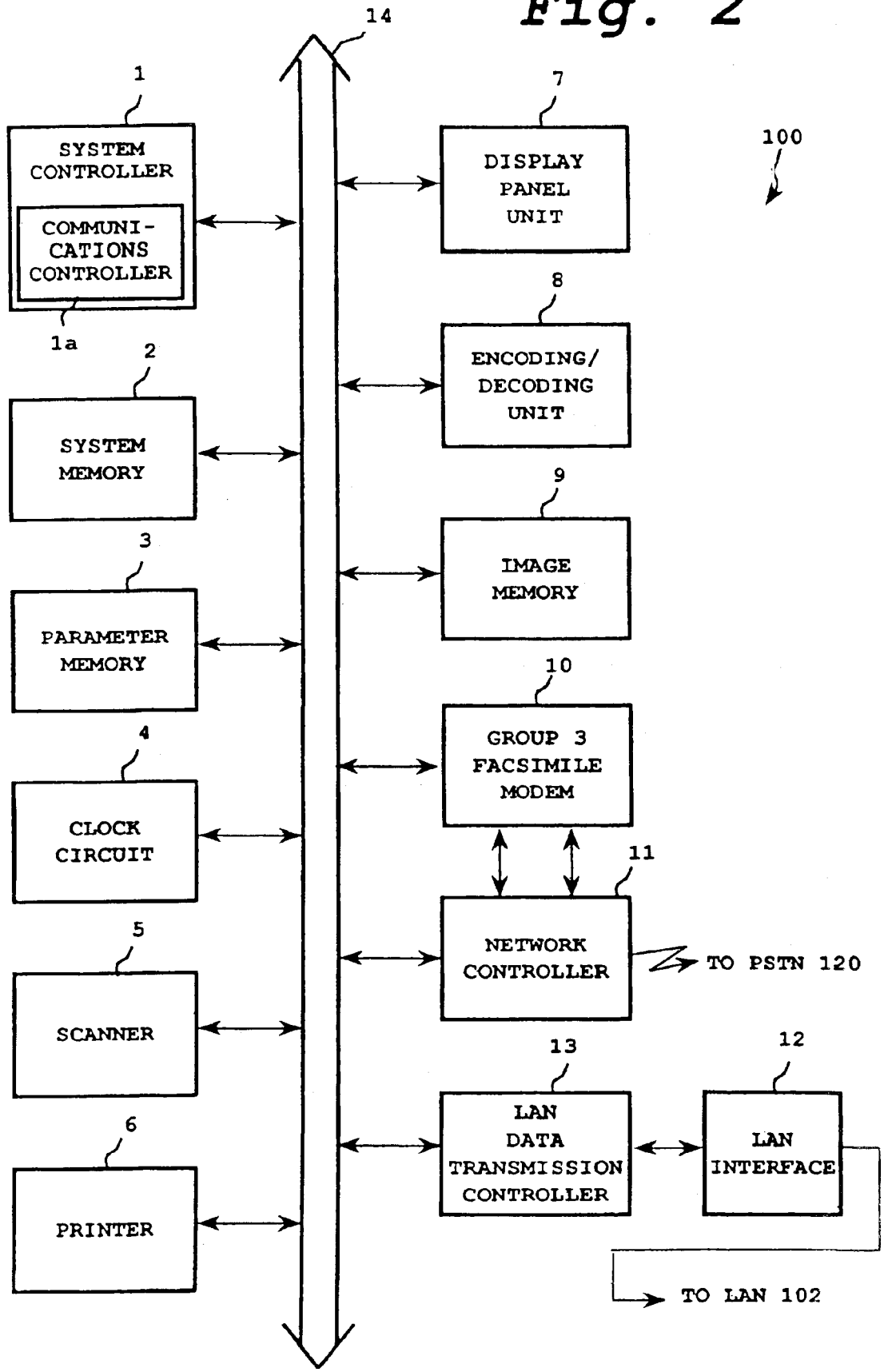
FIG. 2 is a block diagram of the network facsimile apparatus included in the electronic communications system of FIG. 1.

The above-described units of the network facsimile apparatus 100 are connected commonly to the internal bus 14, directly or indirectly, as shown in FIG. 2, so as to communicate with each other.

Figure 3:
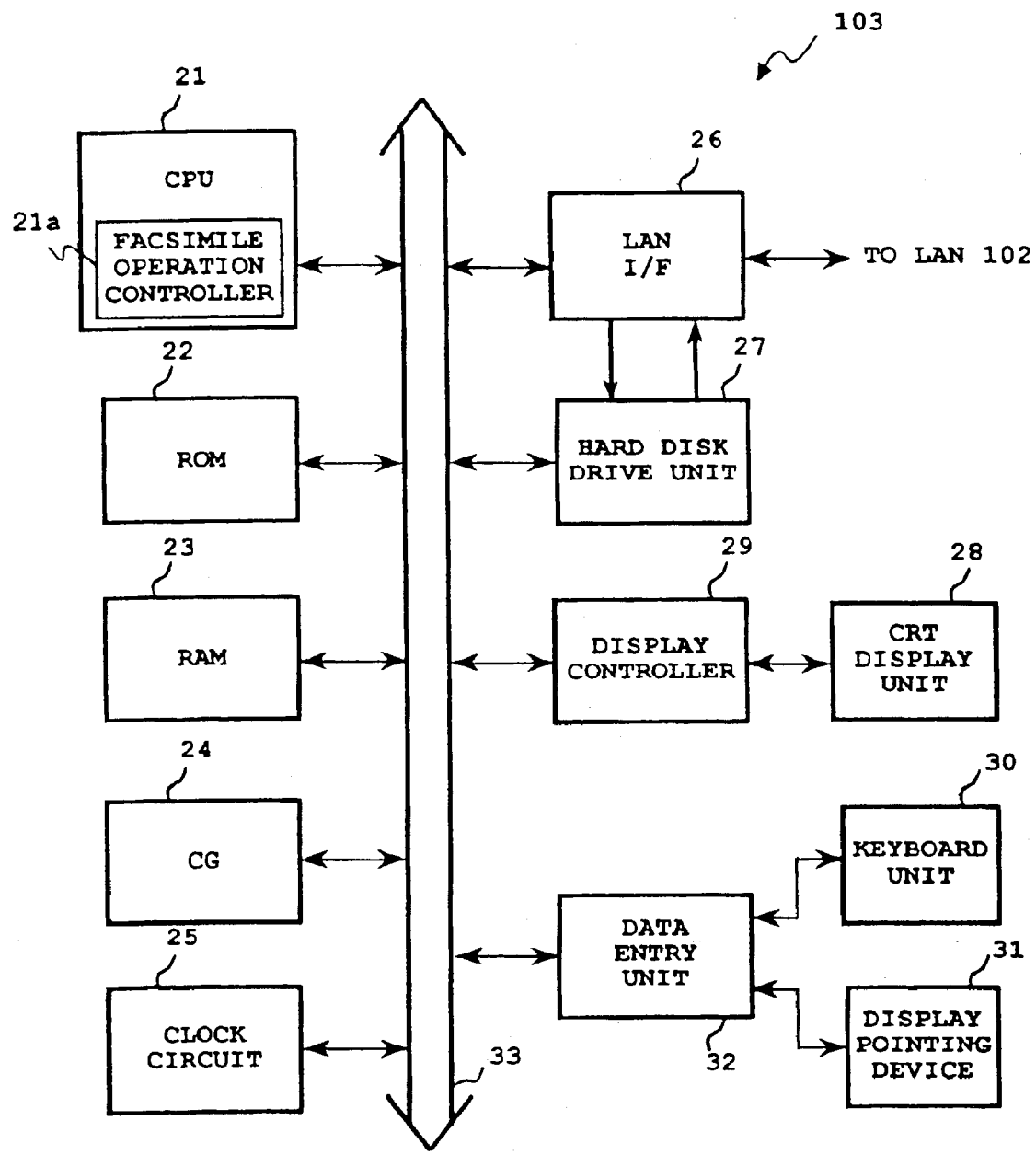
FIG. 3 is a block diagram of the client terminal apparatus included in the electronic communications system of FIG. 1.

Next, an exemplary system configuration of the CLs 103 is explained with reference to FIG. 3. As illustrated in FIG. 3, each of the CLs 103 includes a CPU (central processing unit) 21, a ROM (read only memory) 22, a RAM (random access memory) 23, a character generator (CG) 24, a clock circuit 25, a LAN (local area network) interface 26, a hard disk drive unit 27, a CRT (cathode lay tube) display unit 28, a display controller 29, a keyboard unit 30, a screen pointing device 31, a data entry controller 32, and an internal bus 33.

The CPU 21 controls the operations of the CL 103, and includes a facsimile application controller 21a (explained later). The ROM (read only memory) 22 stores control programs to be executed by the CPU 21 and corresponding data used when executing the control programs. The RAM (random access memory) 23 includes a working memory area reserved for use of the CPU 21. The CG 24 generates data for displaying each character. The clock circuit 25 generates information of the present time. The LAN interface 26 connects the CL 103 to the LAN 102. The hard disk drive 27 stores various application programs including a facsimile application. The hard disk drive 27 also includes various kinds of data including work data, file data, image data, and so forth. The CRT display unit 28 displays a screen with which a user operates the CL 103. The display controller 29 is connected to the CRT display unit 28 and controls the screen contents thereof.

The keyboard unit 30 enters various instructions and data to the CPU 21 of the CL 103 in accordance with the operations thereon by the user. The screen pointing device 31 manipulates a pointer on-screen in order to select a specific location on the screen, for example, in accordance with the user instruction. The data entry controller 32 is connected to the keyboard unit 30 and the screen pointing device 31 to control data entries performed by the user via these data entry devices.

The above-described units of the CL 103 are connected commonly to the internal bus 33, directly or indirectly, as shown in FIG. 3, so as to communicate with each other.

Figure 4:
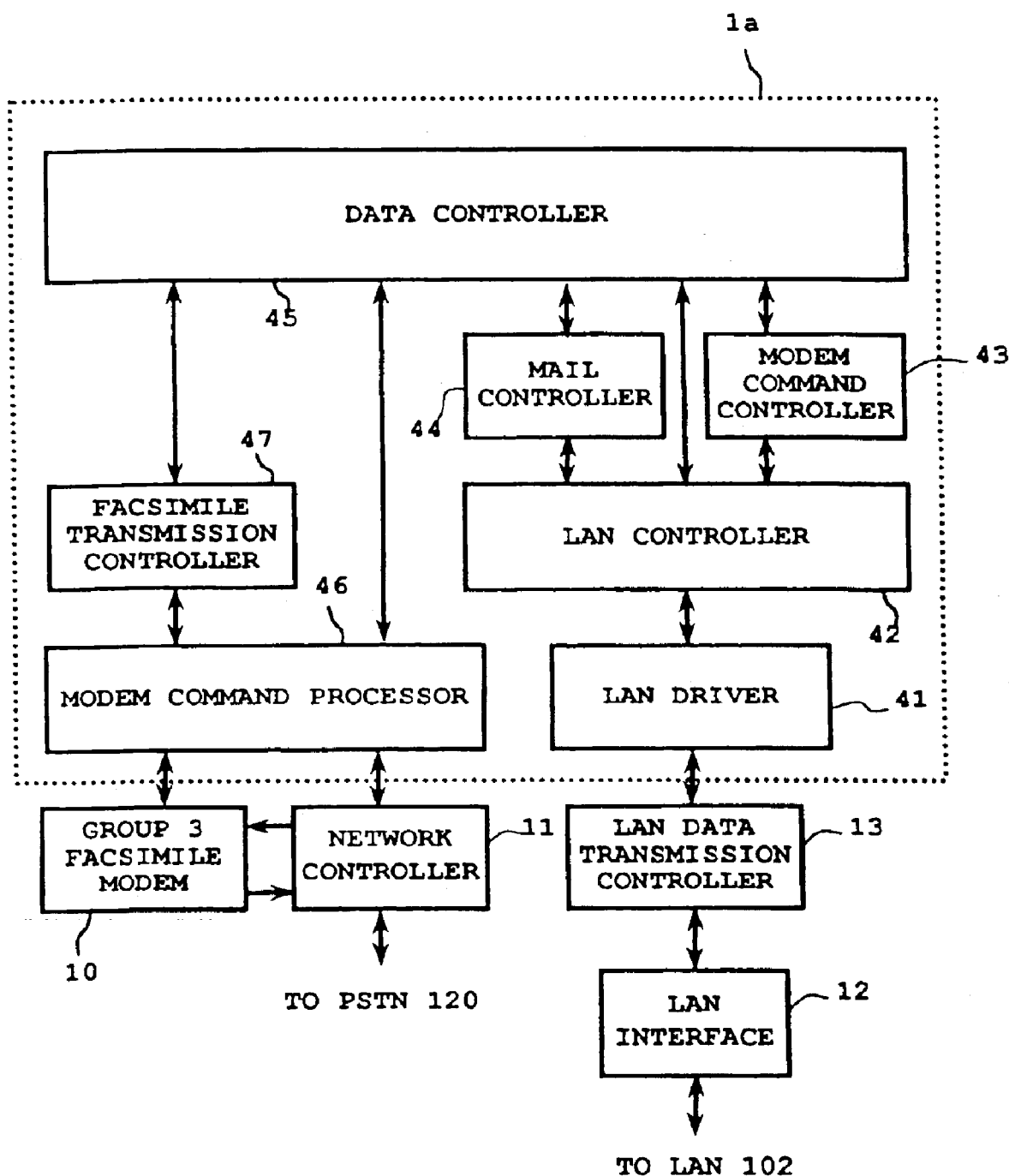
FIG. 4 is a block diagram of a main part of a system controller included in the network facsimile apparatus of FIG. 2.

Next, an exemplary configuration of the communications controller 1a included in the system controller 1 of the network facsimile apparatus 100 is explained with reference to FIG. 4. The network facsimile apparatus 100 executes communications operations, including operations of facsimile communications and electronic mail, under the control of the communications controller 1a of the system controller 1. As shown in FIG. 4, the communications controller 1a of the system controller 1 includes a LAN (local area network) driver 41, a LAN (local area network) controller 42, a modem command controller 43, a mail controller 44, a data controller 45, a modem command processor 46, and a facsimile communications controller 47.

The LAN driver 41 transmits and receives various kinds of data, including modem commands and electronic mail, to and from the LAN data transmission controller 13 and the LAN controller 42. The LAN controller 42 transmits and receives the data of modem commands to and from the modem command controller 43, and of electronic mail to and from the mail controller. Also, the LAN controller 42 transmits and receives data other than the data of modem commands and electronic mail to and from the data controller 45. The modem command controller 43 accepts the modem commands conforming to EIA (electric industries association)-592 (class 2) and generates a set of modem control information that corresponds to such modem commands. The modem command controller 43 transmits and receives these modem commands to and from the modem command processor 46 via the data controller 45.

During the electronic mail transfer process, the mail controller 44 executes the data processing relative to the protocols for lower communications layers and the data controller 45 executes that for higher communications layers. The facsimile communications controller 47 controls facsimile communications control operations including a Group 3 facsimile communications operation. The modem command processor 46 controls the Group 3 facsimile modem 10 and the network controller 11.

Figure 5:
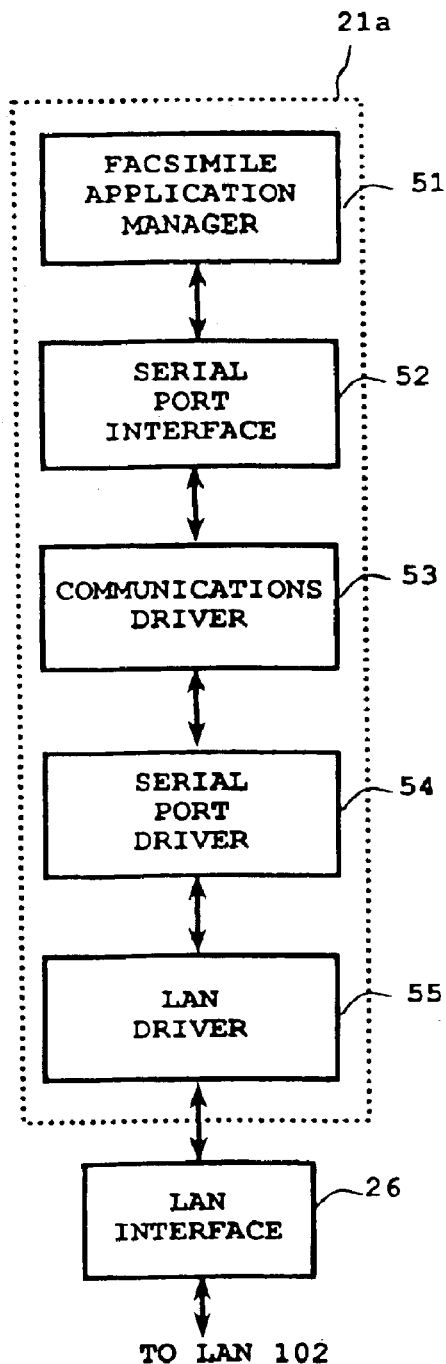
FIG. 5 is a block diagram of a main part of a central processing unit included in the client terminal apparatus of FIG. 3.

Next, an exemplary configuration of the facsimile application controller 21a included in the system controller 21 of each CL 103 is explained with reference to FIG. 5. An exemplary configuration of the facsimile application controller 21a is shown in FIG. 5. The facsimile application controller 21a controls the facsimile application when the CL 103 performs a facsimile communications operation with data terminals such as the network facsimile apparatus 100 having the facsimile and LAN communications capabilities. As shown in FIG. 5, such a facsimile application controller 21a includes a facsimile application manager 51, a serial port interface 52, a communications driver 53, a serial port driver 54, and a LAN (local area network) driver 55.

The facsimile application manager 51 executes the facsimile application in accordance with the facsimile application program resident in the hard disk drive 27. The serial port interface 52 is provided between the facsimile application manager 51 and the communications driver 53, and provides thereto a serial port for sending and receiving serial facsimile data. The communications driver 53 sends and receives various kinds of serial data to and from the serial port interface 52. The serial port driver 54 is provided between the communications driver 53 and the LAN driver 55, and has an important roll in the serial data transmission operation. For example, the serial port driver 54 executes facsimile modem functions and interfaces the serial facsimile data between the communications driver 53 and the LAN driver 55. The LAN driver 55 is connected to the LAN interface 26 to exchange the serial facsimile data therewith.

Figure 6:
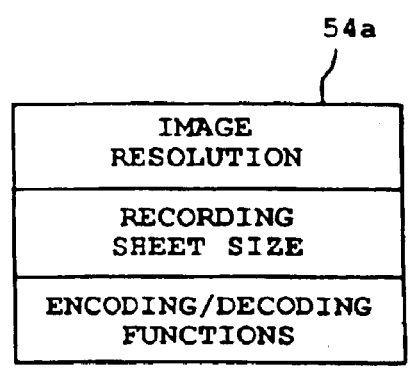
FIG. 6 is an illustration for explaining the contents of memory included in a serial port driver in the central processing unit of FIG. 5.

The serial port driver 54 sends to the facsimile application manager 51 the information of communication capabilities of a called terminal which may be, for example, the network facsimile apparatus 100 when performing the facsimile modem functions. With this operation, the facsimile application manager 51 can generate image information data such that a called terminal can receive the image information data within the communication capabilities thereof. For this purpose, the serial port driver 54 includes a memory 54a for storing the communication capabilities of a called terminal, as shown in FIG. 6. The memory 54a of FIG. 6 stores data representing the information of communication capabilities of a called terminal such as an image resolution, a recording sheet size, and encoding/coding functions. At an appropriate timing during the communication operation with a called terminal, the serial port driver 54 sends to the called terminal a request for the information of the communication capabilities and, upon receiving the response therefrom, stores the received information into the memory 54a.

Figure 7:
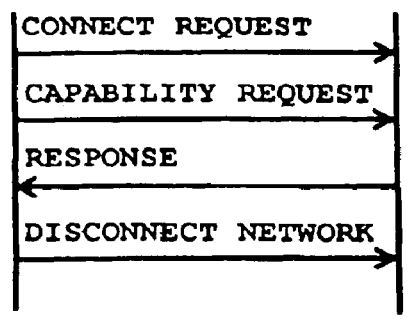
FIG. 7 is a diagram explaining an exemplary procedure of a communications operation performed by the serial port driver of FIG. 5 for collecting the information of communication capabilities from the network facsimile apparatus of FIG. 2.

FIG. 7 shows an exemplary procedure of the above-mentioned operation by the serial port driver 54 when initiating a communications operation to the network facsimile apparatus 100, for example. In the procedure of FIG. 7, first, the serial port driver 54 sends a request for network connection to the network facsimile apparatus 100 via the LAN 102. Upon receiving the response to the request for network connection, the serial port driver 54 sends a request for the communication capabilities to the network facsimile apparatus 100. The network facsimile apparatus 100 sends its communication capabilities to the serial port driver 54 of the calling client terminal 103 upon receiving the request from the serial port driver 54. Then, the serial port driver 54 stores the received information in the memory 21a thereof and sends a request for network disconnection to the network facsimile apparatus 100 via the LAN 102. In this way, the serial port driver 54 obtains the information of communication capabilities of a called terminal. Preferably, the client terminal 103 may perform this operation at intervals of a predetermined time so as to efficiently update the information of the terminals registered in the memory 21a thereof.

Figure 8:
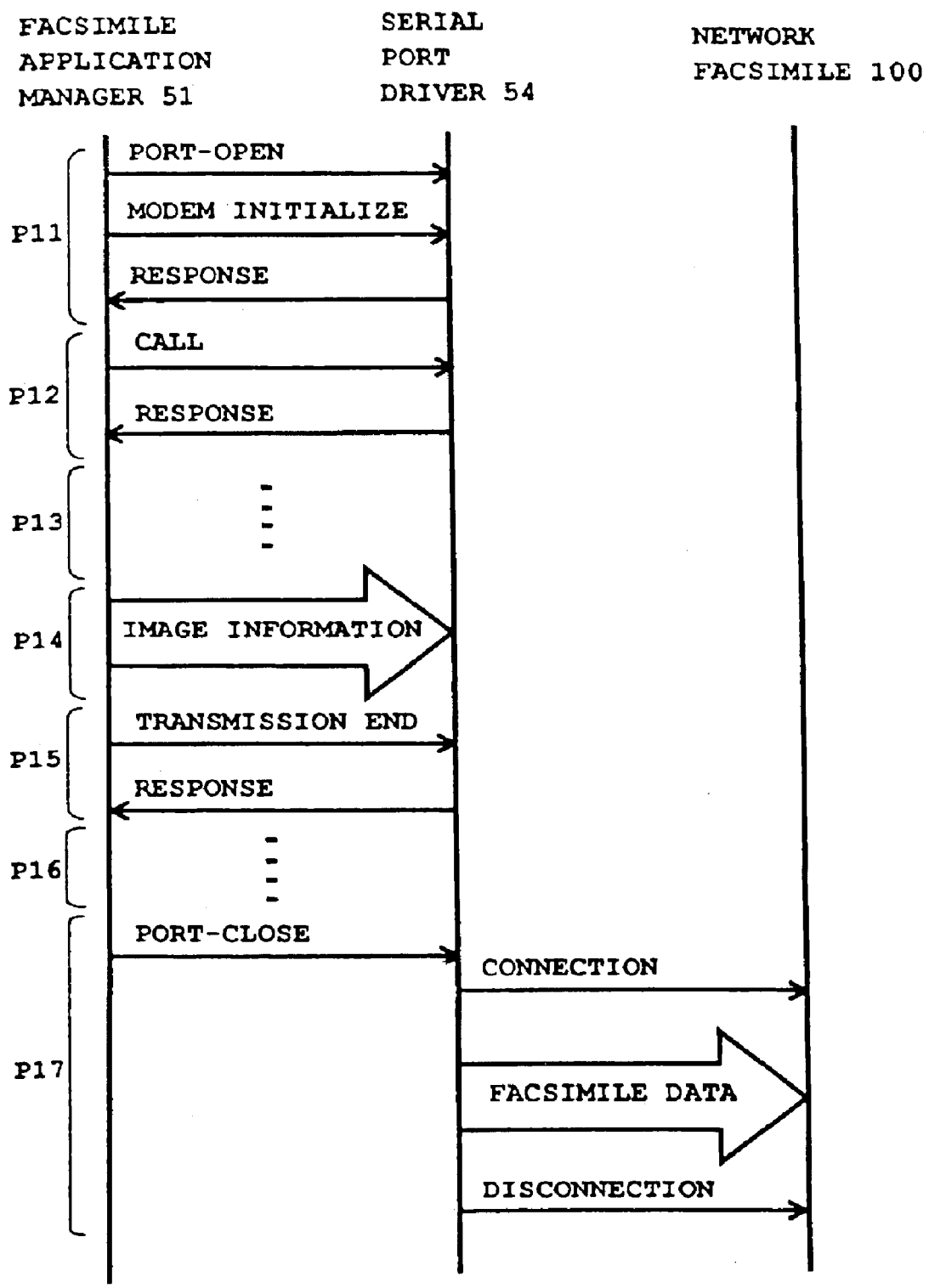
FIG. 8 is a diagram explaining an exemplary sequential communications procedure which includes a facsimile communications operation between the client terminal apparatus of FIG. 3 and the serial port drive of FIG. 5 and a communications operation between the serial port driver and the network facsimile apparatus of FIG. 2.

Referring now to FIG. 8, an exemplary facsimile transmission operation of the facsimile operation controller 21a is provided for instances when the CL 103 sends image information to the network facsimile apparatus 100, wherein a final destination for image information to be transmitted is a specific facsimile terminal (e.g., FAX 121). As shown in FIG. 8, the facsimile transmission operation is split into a plurality of sequential Processes P11–P17, which partly correspond to the standardized sequential phases A–E of the Group 3 facsimile communications procedure. This facsimile transmission operation starts with Process P11 which actually is a start-up process before entering into the standardized sequential phases A–E of the Group 3 facsimile communications procedure. In Process P11, the facsimile application manager 51 of the CL 103 gives the serial port driver 54 start-up instructions including a port-open instruction for activating the serial port and a modem command for initializing the facsimile modem functions. In responding to the start-up instructions given, the serial port driver 54 sends a responsive signal corresponding to the modem command back to the facsimile application manager 51.

In Process P12, which corresponds to phase A of the Group 3 facsimile communications procedure, the facsimile application manager 51 sends a modem command for requesting a transfer call to a specific facsimile machine connected to the PSTN 120 to the serial port driver 54. As this modem command includes the telephone number of the specific destination facsimile machine (e.g., the FAX 121), the serial port driver 54 stores the telephone number upon receiving the modem command. Then, the serial port driver 54 sends a responsive signal corresponding to the modem command back to the facsimile application manager 51.

In Process P13, which corresponds to phase B of the Group 3 communications procedure, the facsimile application manager 51 and the serial port driver 54 perform a predetermined pre-transmission preparation process of the Group 3 facsimile communications procedure. Specifically, the serial port driver 54 sends to the facsimile application manager 51 the information of the communication capabilities of the called network facsimile apparatus 100, which are stored in the memory 21a of the CL103. Based on the information received from the serial port driver 54, the facsimile application manager 51 determines the properties of transmitting image information, such as image density, an encoding method, data size, and so forth. Then, the facsimile application manager 51 sends such information as well as the information of the CL 103 itself, such as its own identification information to the serial port driver 54 during the pre-transmission procedure. The serial port driver 54 stores the received information.

In Process P14, which corresponds to phase C of the Group 3 facsimile communications procedure, the facsimile application manager 51 sends the transmitting image information to the serial port driver 54, and the serial port driver 54 stores the transmitting image information received. Then, in Process P15, corresponding to phase D of the Group 3 facsimile communications procedure, the facsimile application manager 51 sends to the serial port driver 54 a modem command that indicates a completion of transmitting the image information, and the serial port driver 54 responds to the received modem command by sending a corresponding responsive signal back to the facsimile application manager 51.

Subsequently, in Process P16, corresponding to phase E of the Group 3 facsimile communications procedure, the facsimile application manager 51 and the serial port driver 54 perform a predetermined post-transmission preparation process of the Group 3 facsimile communications procedure. After a completion of the predetermined post-transmission preparation, the process proceeds to Process P17.

In Process P17, the facsimile application manager 51 sends an instruction for closing the port to the serial port driver 54. Upon receiving the port-close instruction, the serial port driver 54 ends the communications with the facsimile application manager 51, and sends a request for communications to the network facsimile apparatus 100 via the LAN 102. Further, when the network facsimile apparatus 100 accepts the communications request and connects the line with the CL 103, the serial port driver 54 transmits a set of information to the network facsimile apparatus 100 via the LAN 102. At this time, the set of information includes the telephone number of the specific destination facsimile machine (e.g., the FAX 121), the various kinds of property information with respect to the image information, and the facsimile information of image information. After a completion of the information transmission, the serial port driver 54 sends a line disconnection instruction to the network facsimile apparatus 100. FIG. 9 shows an exemplary data format of the facsimile information transmitted to the called network facsimile apparatus 100 from the serial port driver 54. The exemplary data format of the transmitting facsimile information arranges, as shown in FIG. 9, a set of information including a calling telephone number for specifying a called terminal (i.e., the FAX 121), a local ID (identification) such as a user name for identifying a user of the called terminal or the called terminal itself, an image property header including the recording sheet size, the encoding/coding functions and the image resolution, and image information data. Upon receiving the information in such data format, the called network facsimile apparatus 100 stores the information. Then, the called network facsimile apparatus 100 initiates a call to the destination terminal using the calling telephone number so as to transmit the facsimile image information through the Group 3 facsimile communications procedure using the image property information pertinent to the facsimile image information under transmission.

Before transmitting the facsimile image information to the network facsimile apparatus 100 in the above operation, the serial port driver 54 judges whether the grade of encoding/decoding functions, which is registered as the communication capabilities of the called network facsimile apparatus 100 in the memory 54a, is higher than that used in the facsimile image information received from the facsimile application manager 51. If the grade of encoding/decoding functions stored in the memory 54a is judged as higher than that of the received facsimile image information, the serial port driver 54 compresses the received facsimile image information using encoding/decoding functions of which grade is higher than that of the received facsimile image information so that the called network facsimile apparatus 100 can efficiently receive the facsimile image information.

Figure 10A:
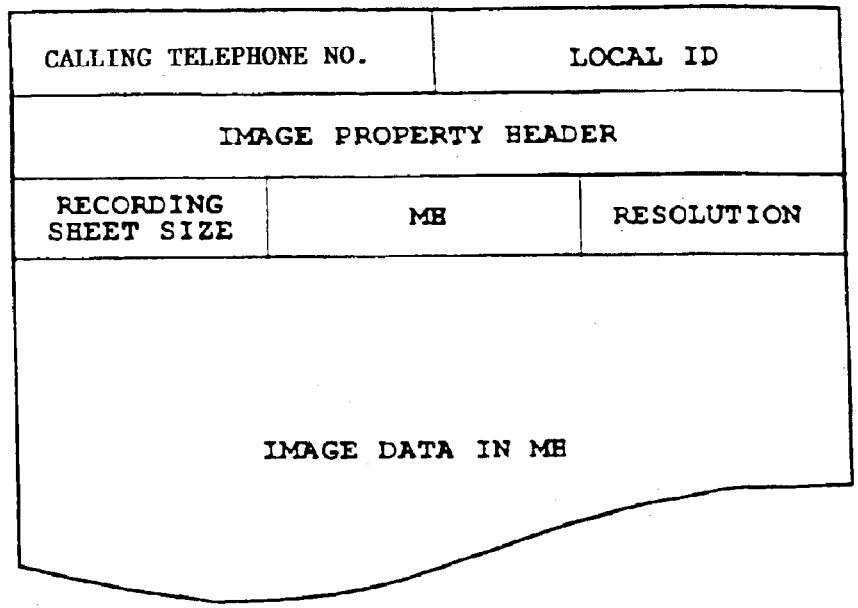
FIGS. 10A and 10B are an illustrations for explaining a case when the serial port driver changes a data conversion method from MH as shown in FIG. 10A to MMR as shown in FIG. 10B for converting a facsimile image generated by the facsimile application manager.
Figure 10B:
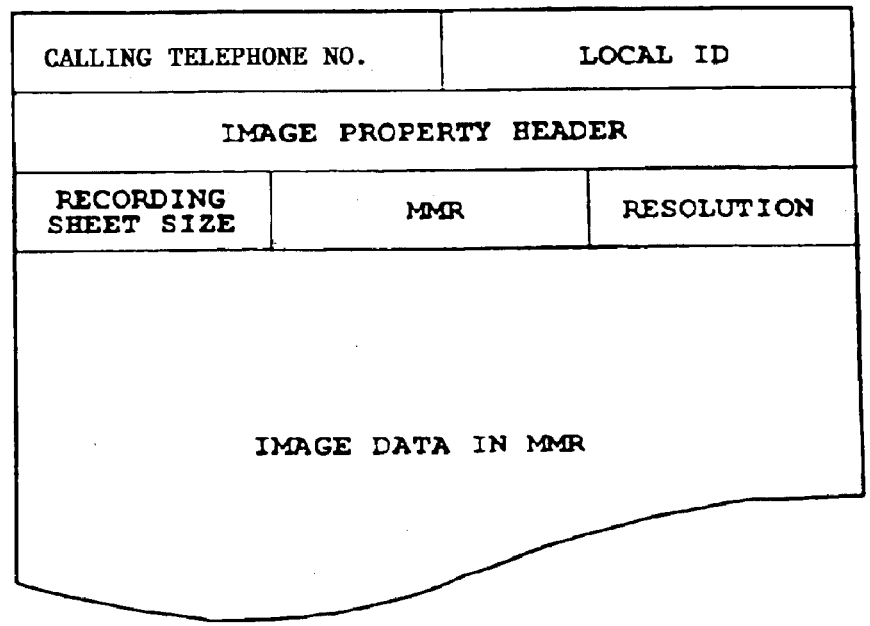

For example, when the received facsimile image information is compressed using the MH method, as shown in FIG. 10A, the serial port driver 54 may convert the received facsimile image ram information using a more efficient data encoding method such as, for example, the MMR, as shown in FIG. 10B, provided that the MMR method is acceptable for the network facsimile apparatus 100.

In this way, the serial port driver 54 can arrange the transmission of the facsimile image information in an efficient manner suitable to the communication capabilities of the network facsimile apparatus 100.

Figure 11:
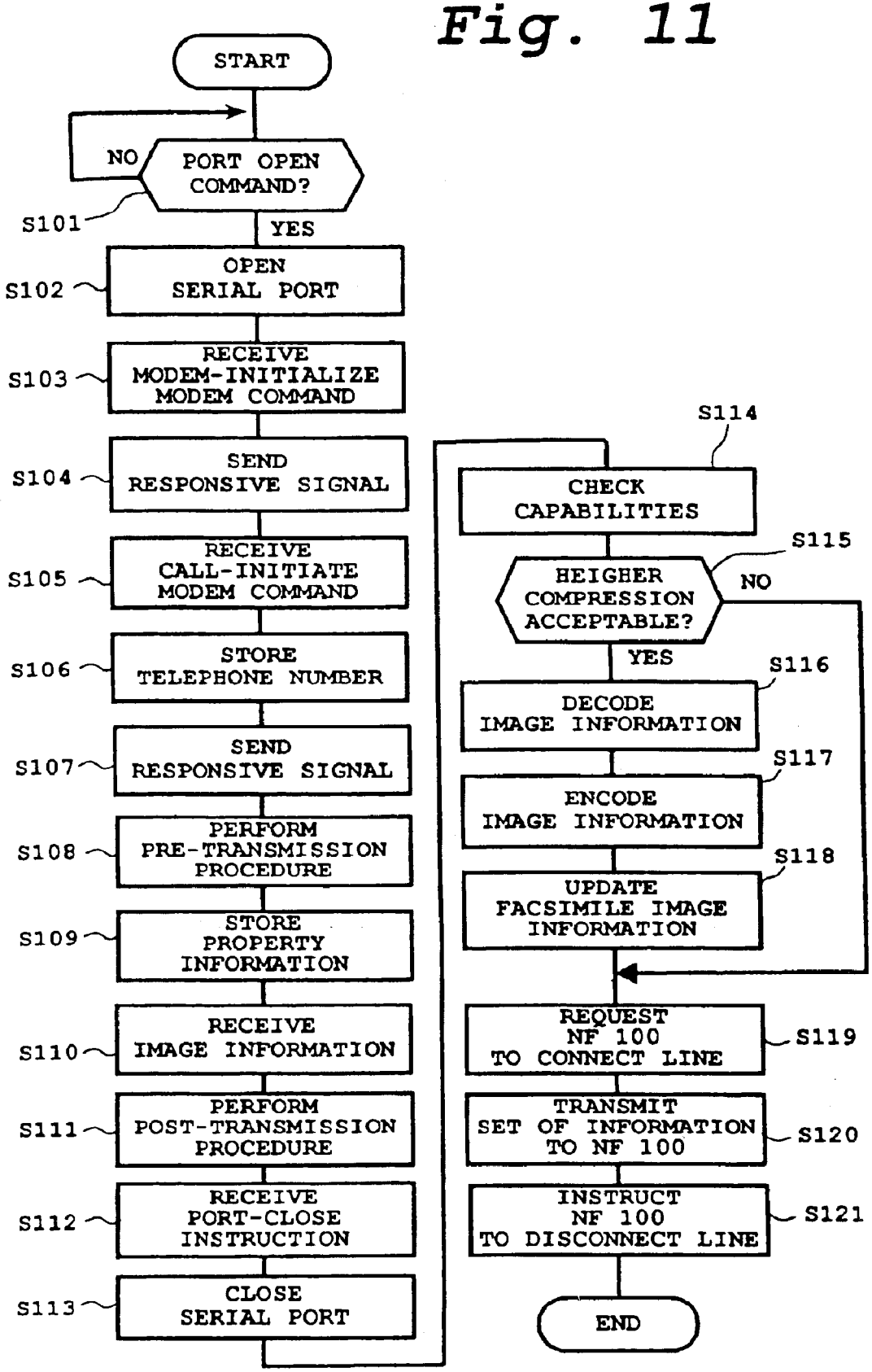
FIG. 11 is a flowchart of the exemplary sequential communications procedure shown in FIG. 8.

Next, an exemplary procedure of the above-described facsimile transmission operation by the serial port driver 54 of the CL 103 is explained with reference to FIG. 11. In Step S101 of FIG. 11, the serial port driver 54 continuously checks if a port-open instruction from the facsimile application manager 51 is detected. If the instruction is detected, the serial port driver 54 turns into an port-open mode in Step S102. Then, the serial port driver 54 receives a modem command for initializing the modem from the facsimile application manager 51 in Step S103, and sends a corresponding responsive signal to the facsimile application manager 51 in Step S104.

In Step S105, the serial port driver 54 receives the modem command for requesting a transfer call to the specific facsimile machine connected to the PSTN 120. The serial port driver 54 then draws the telephone number of that specific facsimile machine from the received modem command and stores the telephone number in Step S106, and subsequently sends a responsive signal corresponding to the modem command back to the facsimile application manager 51 in Step S107.

In Step S108, the serial port driver 54 performs the predetermined pre-transmission procedure of the Group 3 facsimile communications procedure with the facsimile application manager 51, referring to the information of the communication capabilities of the called network facsimile apparatus 100 stored in the memory 54a. In Step S109, the serial port driver 54 stores into the memory 54a the various kinds of information which are included in the signals sent from the facsimile application manager 51 during the above-mentioned pre-transmission procedure. The information includes the properties of transmitting image information, such as an image density, an encoding method, a data size, and so forth, and of the CL 103 itself, such as its own identification information. Such information are stored in the memory 54a as part of the facsimile image information.

In Step S110, the serial port driver 54 receives and stores image information transmitted from the facsimile application manager 51. Such image information received from the facsimile application manager 51 is used as part of the facsimile image information. In Step Sill, after a completion of image information transmission, the serial port river 54 performs the predetermined post-transmission procedure of the Group 3 facsimile communication procedure with the facsimile application manager 51. Then, the serial port driver 54 receives an instruction for closing the port in Step S112 and responds to the instruction by turning the mode into the closed-port mode in Step S113, so that the communications between the facsimile application manager 51 and the serial port driver 54 is terminated.

After the termination of the communications with the facsimile application manager 51, in Step S114, the serial port driver 54 checks the communication capabilities of the called network facsimile apparatus 100, referring to the information stored in the memory 54a. Then, in Step S115, the serial port driver 54 judges if the network facsimile apparatus 100 can handle image information having the data compressed by a higher compression encoding method than the method used in the image information sent from the facsimile application manager 51.

If the judging result of Step S115 is YES, the process proceeds to Step S116 in which the serial port driver 54 decodes the stored image information to an original state and then encodes the image information, in Step S117, using a more efficient encoding method acceptable for the called network facsimile apparatus 100. Then, in Step S118, the serial port driver 54 updates the transmitting facsimile image information using the reconverted image information and the encoding method then used. Then, the process proceeds to Step 3119. If the judging result of Step S115 is NO, the serial port driver 54 does not change the encoding method and the process goes to Step S119.

In Step S119, the serial port driver 54 sends a request for establishing a line connection to the network facsimile apparatus 100 via the LAN interface 26 of the LC 103 and the LAN 102. If the network facsimile apparatus 100 accepts the request and connects the line, the serial port driver 54 transmits in Step S120 the stored facsimile image information to the network facsimile apparatus 100 via the LAN interface 26 of the LC 103 and the LAN 102. The stored facsimile image information includes the telephone number of the specific facsimile machine connected to the PSTN 120, the properties of transmitting image information such as an image density, an encoding method, a data size, and the image information. Finally, in Step S121, upon completing the information transmission performed in Step S120, the serial port driver 54 sends an instruction for disconnecting the network communications to the network facsimile apparatus 100.

Figure 12:
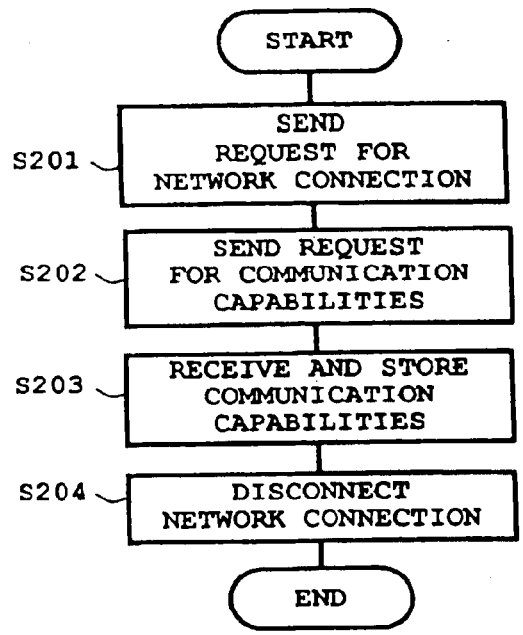
FIG. 12 is a flowchart showing the exemplary communications procedure of FIG. 7 performed by the serial port driver of FIG. 5.

An exemplary procedure of an operation performed by the serial port driver 54 for receiving the information of communication capabilities of the network facsimile apparatus 100 is shown in FIG. 12. When the serial port driver 54 needs to receive the information of communication capabilities from the network facsimile apparatus 100, it first sends a request for connection to the network facsimile apparatus 100 via the LAN 102 in Step S201 as shown in FIG. 12. Upon receiving a response from the network facsimile apparatus 100, the serial port driver 54 sends in Step S202 a request for the information of communication capabilities to the network facsimile apparatus 100. Then, in Step S203, the serial port driver 54 will receive the information of communication capabilities from the network facsimile apparatus 100 and stores the information. Upon a completion of receiving the information of communication capabilities, the serial port driver 54 sends in Step S204 a command of line disconnection to the network facsimile apparatus 100. In this way, the serial port driver 54 performs the exemplary operation for receiving the information of communication capabilities of the network facsimile apparatus 100.

Figure 13:
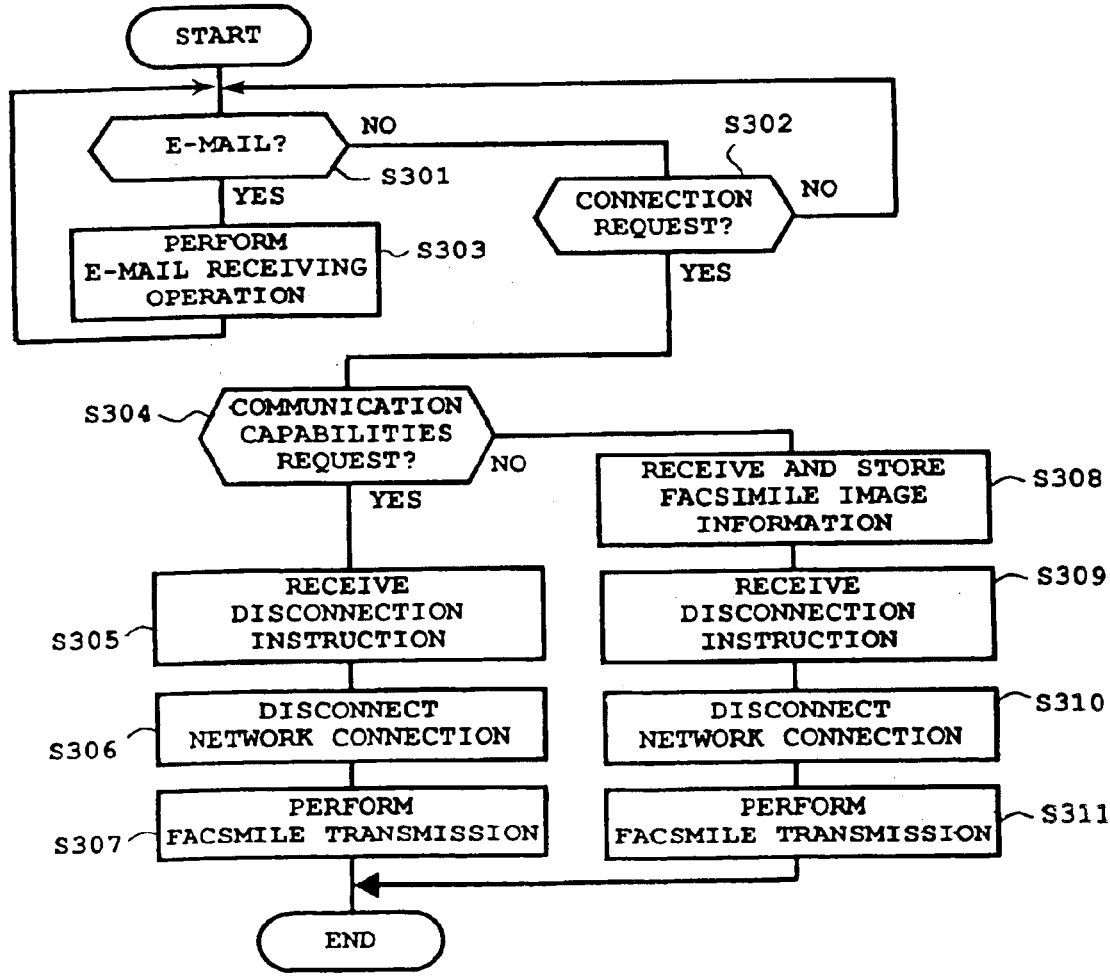
FIG. 13 is a flowchart of an exemplary communications operation performed by the network facsimile apparatus of FIG. 2 in response to the operation of the serial port driver during the exemplary communications procedure of FIG. 12.

FIG. 13 explains an exemplary procedure of the network facsimile apparatus 100's operation during the above-described facsimile transmission operation. In the network facsimile apparatus 100, the system controller 1 keeps constant watch on an incoming signal from outside and checks if it is an electronic mail in Step S301 and if it is a request for the network communications in Step S302, as shown in FIG. 13. If the check result of Step S301 is YES, meaning that the network facsimile apparatus 100 receives an electronic mail, the system controller 1 performs a predetermined operation for receiving electronic mail in Step S303, and the process returns to Step S301. If the check result of Step S301 is NO, meaning that the network facsimile apparatus 100 receives no electronic mail, the process proceeds to Step S302 where it is monitored if the network facsimile apparatus 100 receives a network communications request.

If the network facsimile apparatus 100 receives no network communications request and the check result of Step S302 is NO, the process returns to Step S301. If the network facsimile apparatus 100 receives the network communications request and the check result of Step S302 is YES, the process proceeds to Step S304. In Step S304, the system controller 1 checks if it receives a request for the information of communication capabilities from the CL 103. If the check result of Step S304 is YES, the system controller 1 sends in Step S305 the information of communication capabilities thereof to the sending CL 103 via the LAN 102. Then, the system controller 1 receives a network-disconnect instruction from the CL 103 in Step S306 and disconnects the network connection with the sending CL 103 in Step S307. After that, the process ends.

If the check result of Step S304 is NO, the process goes to Step S308 and the system controller 1 receives and stores the facsimile image information from the CL 103. Then, the system controller 1 receives a network-disconnect instruction from the CL 103 in Step S309 and disconnects the network connection with the sending CL 103 in Step S310. After that, the system controller 1 initiates a call to the destination facsimile terminal using the received telephone number and then performs the transmission operation of the facsimile image information. The process then ends.

As described above, in the above-described facsimile operation controller 21*a* of the CL 103, the serial port driver 54 is configured to communicate with the facsimile application manager 51 so that the facsimile application manager 51 is not required to communicate directly with the network facsimile apparatus 100. The facsimile application manager 51 can accordingly avoid a problematic time delay in the communications with the network facsimile apparatus 100 through the Group 3 facsimile communications procedure. Thus, the CL 103 can properly perform the facsimile transmission operation to the network facsimile apparatus 100 without an error caused due to the delay time.

As is also described above, in the above-described facsimile operation controller 21*a* of the CL 103, the serial port driver 54 is configured to store the information of communication capabilities of the called terminal (i.e., the network facsimile apparatus 100) and uses such information when communicating with the facsimile application manager 51 so that the facsimile application manager 51 can generate facsimile information which is acceptable for the network facsimile apparatus 100. Accordingly, the serial port driver 54 can perform the facsimile communications in a proper manner.

Also, as described above, in the above-described facsimile operation controller 21*a* of the CL 103, the serial port driver 54 is configured to decode and again encode the facsimile image information received from the facsimile application manager 51 when the compression method used in the received information is of low grade than the compression method which can be handled by the network facsimile apparatus 100, which is registered therein. Accordingly, this operation contributes to reduce a reverse influence to the level of communications traffic of the LAN 102.

Figure 14:
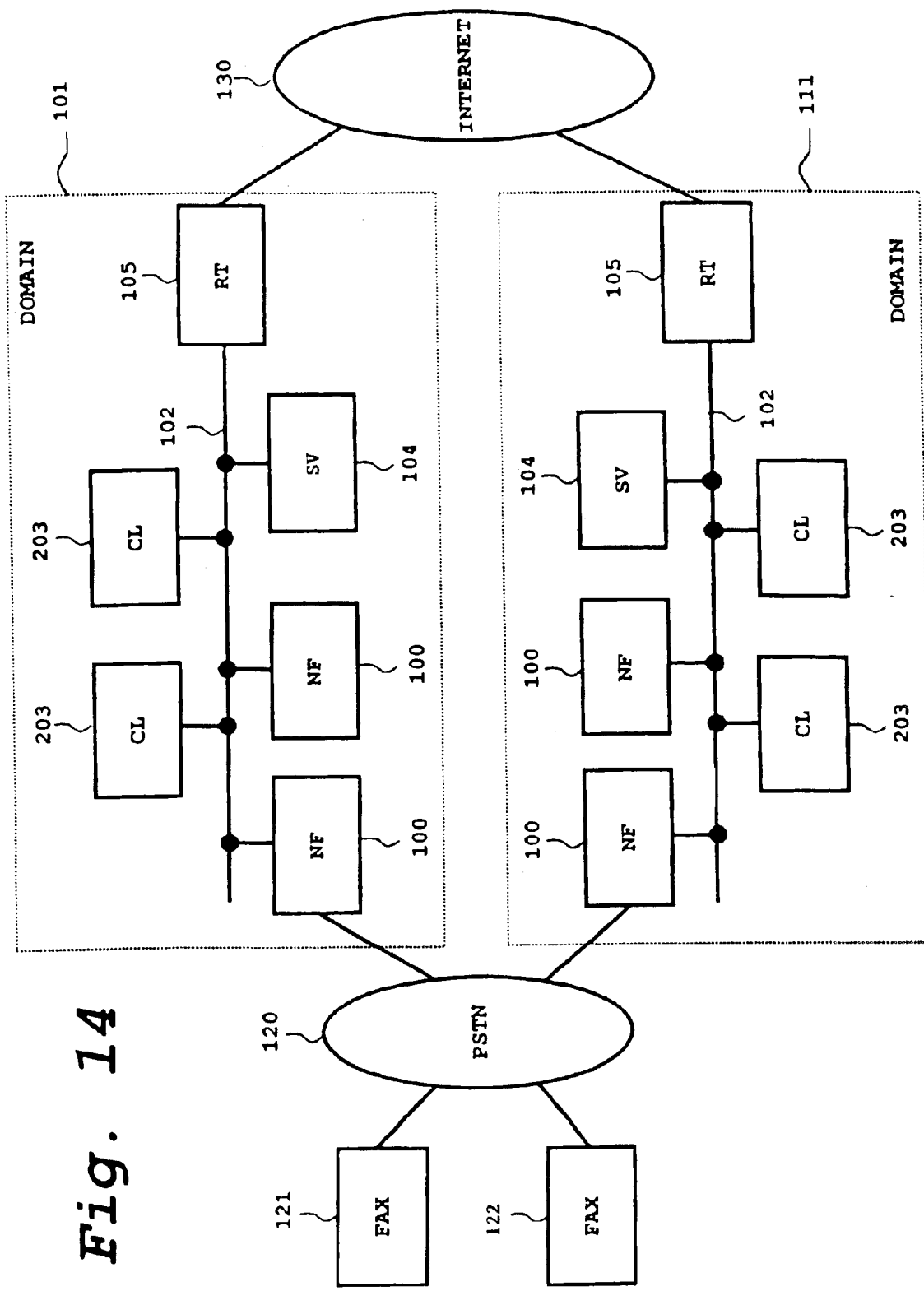
FIG. 14 is a block diagram of an electronic communications system including a client terminal apparatus and a network facsimile apparatus according to a second embodiment of the present invention.
Figure 15:
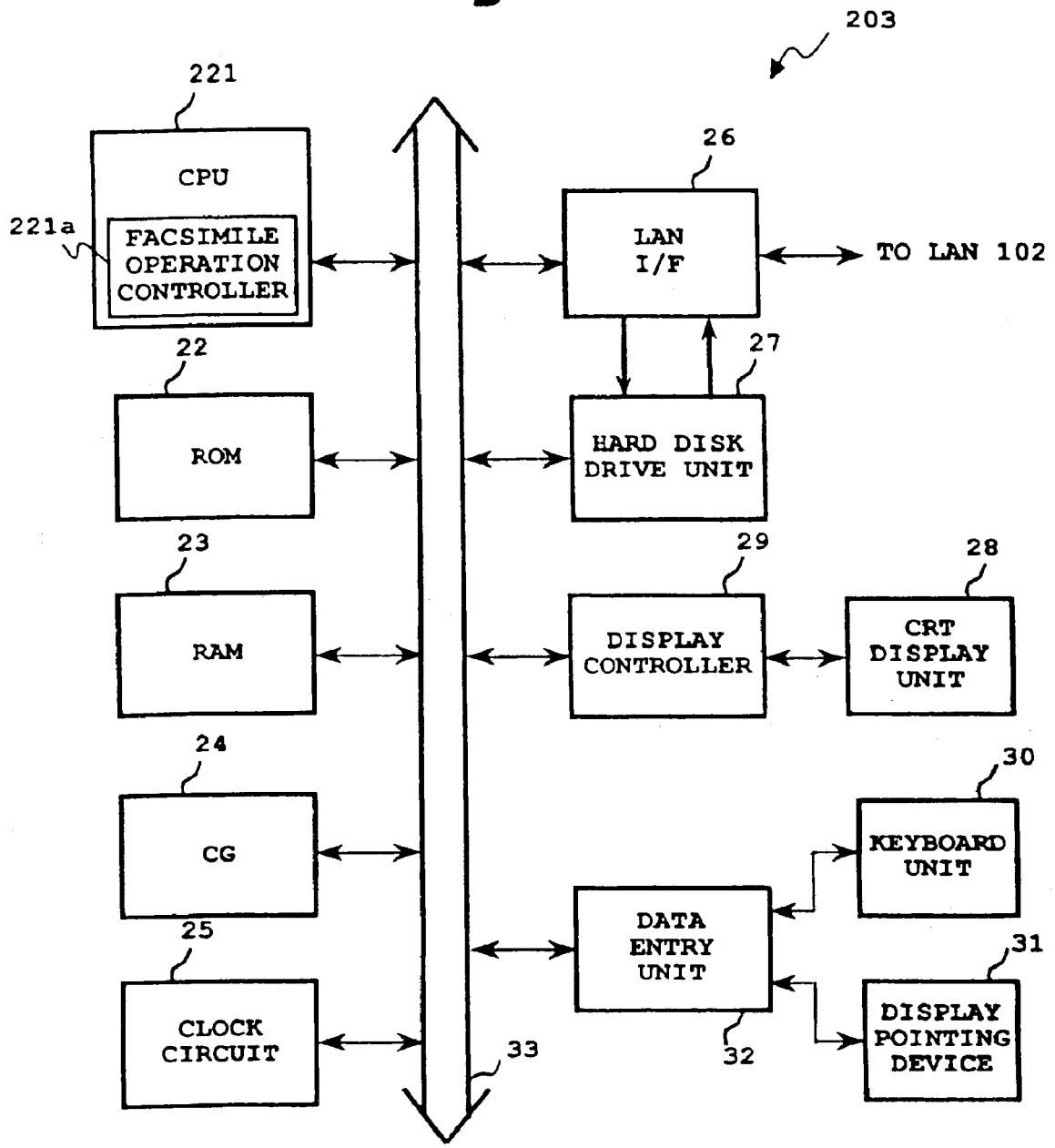
FIG. 15 is a block diagram of the client terminal apparatus included in the electronic communications system of FIG. 14.
Figure 16:
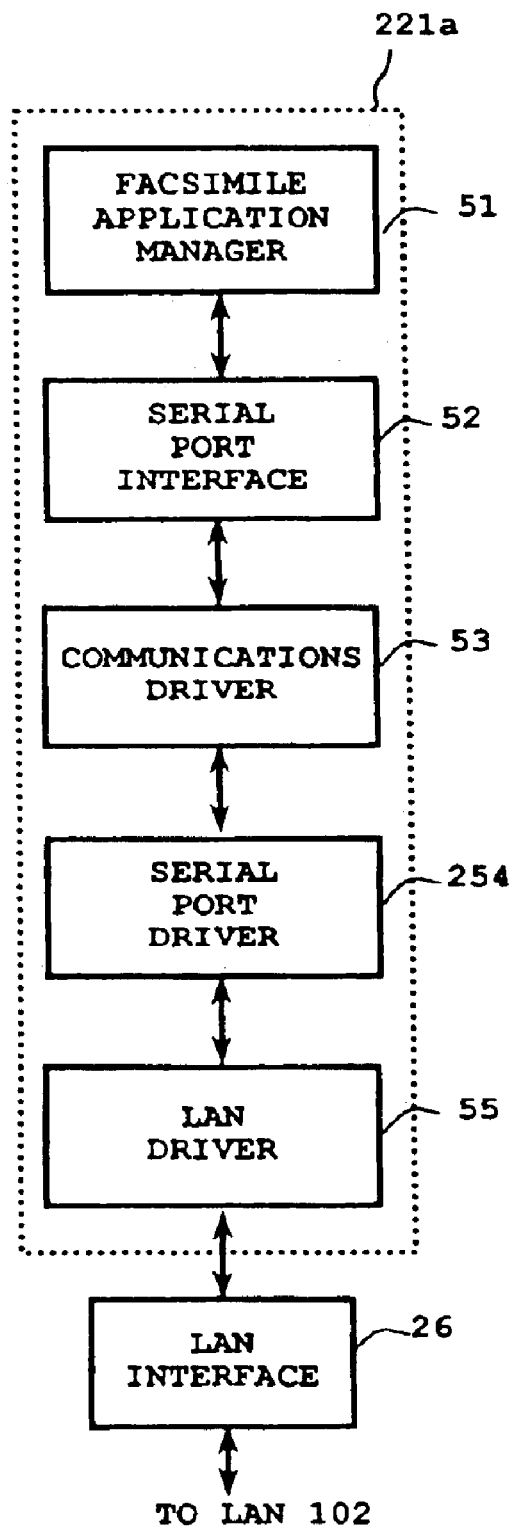
FIG. 16 is a block diagram of a main part of a central processing unit included in the client terminal apparatus of FIG. 15.

Next, an electronic communications system according to another embodiment of the present invention is explained with reference to FIG. 14. The electronic communications system of FIG. 14 is similar in configuration and functions to that of FIG. 1, except for an inclusion of a plurality of the network facsimile apparatuses 100 and a plurality of modified client terminals (CLs) 203 in each LAN 102. Each network facsimile apparatus 100 of FIG. 14 is similar to that of FIG. 2, and detailed description for these apparatuses are therefore omitted. Each modified client terminal (CL) 203 of FIG. 14 has a configuration shown in FIG. 15, which is similar to the CL 103 of FIG. 3, except for a CPU (central processing unit) 221 which includes a facsimile operation controller 221*a*. The facsimile operation controller 221*a* has a configuration shown in FIG. 16, which is similar to the facsimile operation controller 21 of FIG. 5, except for a serial port driver 254. The serial port driver 254 is similar to the serial port driver 54 of FIG. 5, except for a memory 254*a*. The memory 254*a* stores information similar to those stored in the memory 54*a*, except for the inclusion of communication capability information for a plurality of the network facsimile apparatuses 100.

Figure 17:
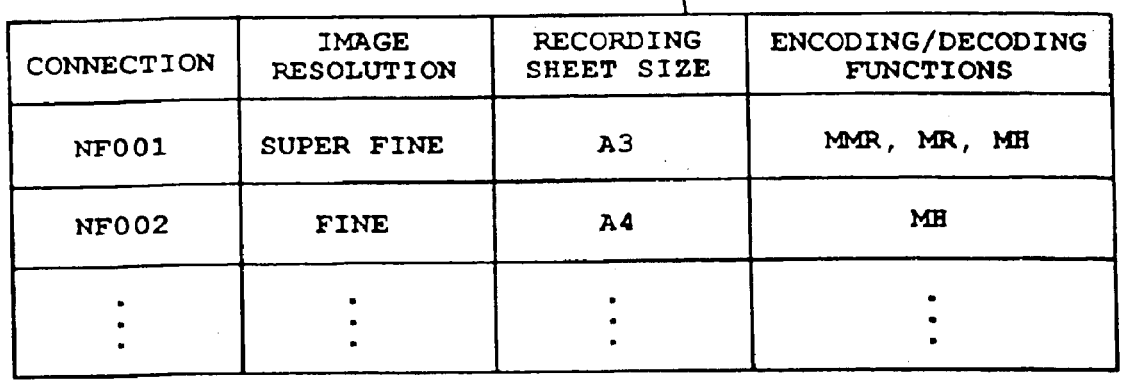
FIG. 17 is an illustration for explaining the contents of memory included in a serial port driver in the central processing unit of FIG. 16.

As shown in FIG. 17, the memory 254*a* includes a connection identifying each of a plurality of the network facsimile apparatuses 100 with a specific name such as "NF001," for example, an image resolution such as "SUPER FINE," a recording sheet size such as "A3," and encoding/decoding functions such as "MMR, MR, MH."

Figure 18:
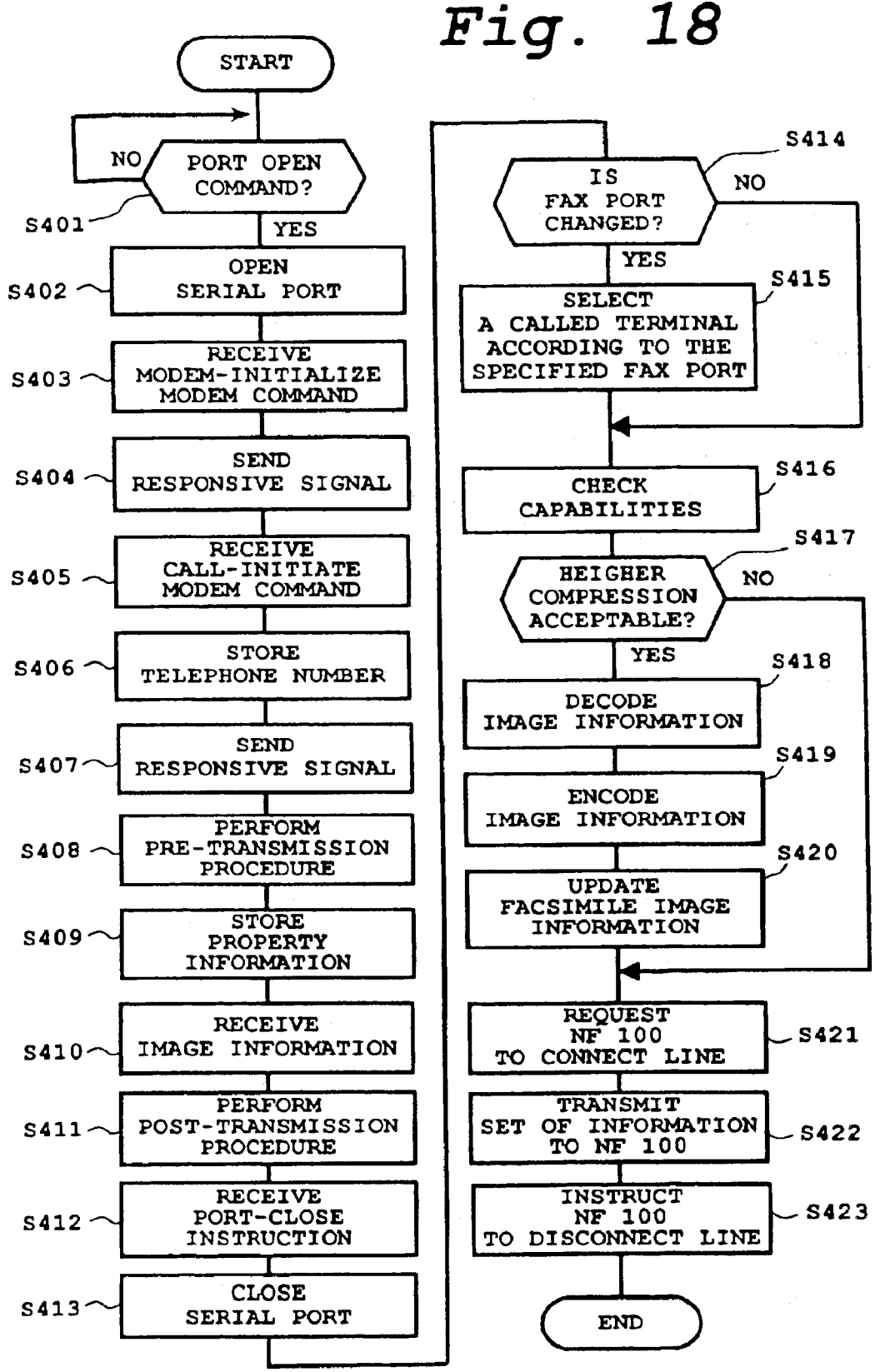
FIG. 18 is a flowchart for explaining an exemplary sequential communications procedure which includes a facsimile communications operation between the client terminal apparatus of FIG. 15 and the serial port drive of FIG. 16 and a communications operation between the serial port driver and the network facsimile apparatus of FIG. 14.

Referring now to FIG. 18, an exemplary procedure of an operation performed by the serial port driver 254 of CL 203 for transmitting facsimile image data and related information addressed to a destination facsimile terminal (i.e., the FAX 121) to a specific network facsimile apparatus 100 in the electronic communications system of FIG. 14 is explained. In Step S401 of FIG. 18, the serial port driver 254 continuously checks if a port-open instruction with a specification of a facsimile port location from the facsimile application manager 51 is detected. If the instruction is detected, the serial port driver 254 turns the specified facsimile port into an port-open mode in Step 3402. Then, the serial port driver 254 receives a modem command for initializing the modem from the facsimile application manager 51 in Step S403, and sends a corresponding responsive signal to the facsimile application manager 51 in Step S404.

In Step S405, the serial port driver 254 receives the modem command for requesting a transfer call to the specific facsimile machine connected to the PSTN 120. The serial port driver 254 then draws the telephone number of that specific facsimile machine from the received modem command and stores the telephone number in Step S406, and subsequently sends a responsive signal corresponding to the modem command back to the facsimile application manager 51 in Step S407.

In Step S408, the serial port driver 254 performs the predetermined pre-transmission procedure of the Group 3 facsimile communications procedure with the facsimile application manager 51, referring to the information of the communication capabilities of the called network facsimile apparatus 100 from among those of the network facsimile apparatuses 100 stored in the memory 254a. In Step S409, the serial port driver 254 stores into the memory 254a the various kinds of information which are included in the signals sent from the facsimile application manager 51 during the above-mentioned pre-transmission procedure. The information includes the properties of transmitting image information, such as an image density, an encoding method, a data size, and so forth, and of the CL 203 itself, such as its own identification information. Such information are stored in the memory 254a as part of the facsimile image information.

In Step S410, the serial port driver 254 receives and stores image information transmitted from the facsimile application manager 51. Such image information received from the facsimile application manager 51 is used as part of the facsimile image information. In Step S411, after a completion of image information transmission, the serial port river 254 performs the predetermined post-transmission procedure of the Group 3 facsimile communication procedure with the facsimile application manager 51. Then, the serial port driver 254 receives an instruction for closing the port in Step S412 and responds to the instruction by turning the specified facsimile port into the closed-port mode in Step S413, so that the communications between the facsimile application manager 51 and the serial port driver 254 is terminated.

After the termination of the communications with the facsimile application manager 51, the serial port driver 254 checks in Step S414 whether the specified facsimile port is changed from a default facsimile port. The change of the facsimile port may be made by a user operation. For example, a facsimile port for NF001 (see FIG. 17) may be assigned as the default facsimile port and the user may change it to a facsimile port for NF002, for example, on an as needed basis.

If the check result of Step S414 is YES, the serial port driver 254 selects in Step S415 a connection (see FIG. 17) from among a plurality of the registered network facsimile apparatuses 100 corresponding to the specified facsimile port. The process then proceeds to Step S416 in which the serial port driver 254 checks the communication capabilities of the called network facsimile apparatus 100, referring to the information stored in the memory 254a.

When the check result of Step S414 is NO, a connection corresponding to the specified facsimile port is already selected and therefore the process goes to Step S416. Then, in Step 5417, the serial port driver 254 judges if the network facsimile apparatus 100 can handle image information having the data compressed by a higher compression encoding method than the method used in the image information sent from the facsimile application manager 51.

If the judging result of Step S417 is YES, the process proceeds to Step S418 in which the serial port driver 254 decodes the stored image information to an original state and then encodes the image information, in Step S419, using a more efficient encoding method acceptable for the called network facsimile apparatus 100. Then, in Step S420, the serial port driver 254 updates the transmitting facsimile image information using the reconverted image information and the encoding method then used. Then, the process proceeds to Step 5421. If the judging result of Step S417 is NO, the serial port driver 254 does not change the encoding method and the process goes to Step S421.

In Step S421, the serial port driver 254 sends a request for establishing a line connection to the network facsimile apparatus 100 via the LAN interface 26 of the LC 203 and the LAN 102. If the network facsimile apparatus 100 accepts the request and connects the line, the serial port driver 254 transmits in Step S422 the stored facsimile image information to the network facsimile apparatus 100 via the LAN interface 26 of the LC 203 and the LAN 102. The stored facsimile image information includes the telephone number of the specific facsimile machine connected to the PSTN 120, the properties of transmitting image information such as an image density, an encoding method, a data size, and the image information. Finally, in Step S423, upon completing the information transmission performed in Step S422, the serial port driver 254 sends an instruction for disconnecting the network communications to the network facsimile apparatus 100.

Figure 19:
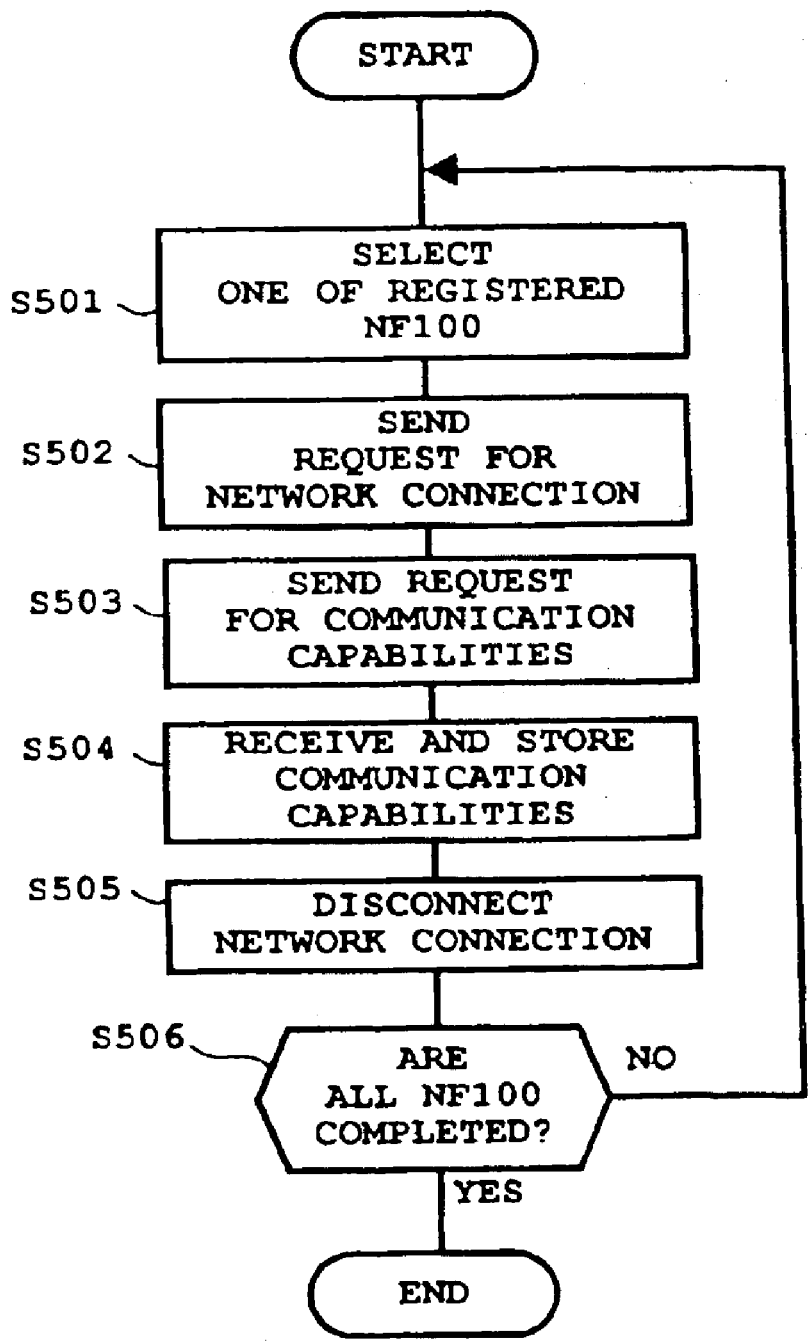
FIG. 19 is a flowchart for explaining an exemplary procedure of a communications operation performed by the serial port driver of FIG. 16 for collecting the information of communication capabilities from the network facsimile apparatus of FIG. 14.

FIG. 19 shows an exemplary procedure of an operation performed by the serial port driver 254 of the CL203 of FIG. 14 for receiving the information of communication capabilities of a plurality of the network facsimile apparatuses 100 registered in the memory 254a. In Step S501 of FIG. 19, the serial port driver 254 selects one network facsimile apparatus 100 from among a plurality of the network facsimile apparatuses 100 registered in the memory 254a. Then, in Step S502, the serial port driver 254 sends a request for connection to the network facsimile apparatus 100 via the LAN 102. Upon receiving a response from the network facsimile apparatus 100, the serial port driver 254 sends in Step S503 a request for the information of communication capabilities to the network facsimile apparatus 100. Then, in Step S504, the serial port driver 254 will receive the information of communication capabilities from the network facsimile apparatus 100 and stores the information. Upon a completion of receiving the information of communication capabilities from the selected network facsimile apparatus 100, the serial port driver 254 sends in Step S505 a command of line disconnection to the network facsimile apparatus 100. Then, the process proceeds to Step S506 in which the serial port driver 254 check if it receives the information of communication capabilities from all the network facsimile apparatuses 100 registered in the memory 254a. If the check result of Step S506 is YES, the process returns to Step S501, and if the check result of Step S506 is NO, the process ends. In this way, the serial port driver 254 can collect the information of communication capabilities from all the network facsimile apparatuses 100 registered in the memory 254a.

As described above, in the above-described facsimile operation controller 221a of the CL 203, the serial port driver 254 is configured to store the information of communication capabilities of a plurality of the network facsimile apparatuses 100 in the memory 254a thereof. Also, the serial port driver 254a can select the information of a called network facsimile apparatus 100 from among such information stored in the memory 254a when communicating with the facsimile application manager 51 so as to inform the information of communication capabilities of the called network facsimile apparatus 100. Thereby, the facsimile application manager 51 can generate facsimile information in accordance with the information of communication capabilities of the called network facsimile apparatus 100, which has been informed from the serial port driver 254a. Each of the facsimile image information generated by the facsimile application manager 51 can be handled by the network facsimile apparatus 100. As a result, the serial port driver 254 can perform the facsimile communications in a proper manner without causing a communications error.

In addition, the electronic communications systems of FIGS. 1 and 14 may use a digital connection, instead of the analog connection used in the present embodiment between the network facsimile apparatus 100 and the FAX 121.

Also, the serial port driver of the facsimile operation controller used in the client terminals may use the AT command set (also known as Hayes command set) during the operation for collecting the information of communication capabilities of the network facsimile apparatus 100 from the network facsimile apparatus 100 although the present embodiment uses non-proprietary command set. For example, when the serial port driver sends to the network facsimile apparatus an AT command "AT+FDIS=?," the network facsimile apparatus responds by sending the information of communication capabilities presently set. Further, when the serial port driver sends an AT command "AT+FDIS=?," the network facsimile apparatus returns the information of maximum communication capabilities operable.

The embodiment of the present application may be conveniently implemented using a conventional general purpose digital computer programmed according to the teachings of the present specification, as will be apparent to those skilled in the art. Appropriate software coding can readily be prepared based on the teachings of the present disclosure, as will be apparent to those skilled in the art. The present application may also be implemented by the preparation of application specific integrated circuits or by interconnecting an appropriate network of conventional component circuits, as will be readily apparent to those skilled in the art.

Numerous additional modifications and variations of the present application are possible in light of the above teachings. It is therefore to be understood that within the scope of the appended claims, the present application may be practiced otherwise than as specifically described herein.

This document claims the priority rights of and is based on the subject matter contained in Japanese patent application no. JPAP10-123051 filed May 6, 1998, the entire contents of which are herein incorporated by reference.

I claim:

1. A method of transmitting an information transfer request from a client data terminal, which is coupled to a local area network, to a called data terminal which is coupled to said local area network and a public switched telephone network, said method comprising:

collecting information sets of communication capabilities of a plurality of different data terminals on said local area network at an arbitrary time on said client data terminal, said different data terminals being coupled to said local area network and said public switched telephone network and including said called data terminal;

storing said information sets of communication capabilities into a memory;

generating, on said client data terminal, facsimile image information by reference to one of said stored information sets of communication capabilities pertaining to said called data terminal, wherein the facsimile image is generated in accordance with the stored information set of communication capabilities pertaining to said called data terminal, in order for the facsimile image to be have facsimile image properties which are acceptable to the called data terminal;

creating on said client data terminal an information transfer request for requesting transmission of said facsimile image information to an arbitrary facsimile machine connected to said public switched telephone network;

sending said information transfer request from said client data terminal to a communications controller; and transmitting said information transfer request from said communications controller to said called data terminal through said local area network upon a completion of said sending step.

2. The method of claim 1, wherein said information transfer request includes a telephone number of said arbitrary facsimile machine, said facsimile image information to be transmitted, property information of said facsimile image information, and identification information identifying said called data terminal.

3. The method of claim 2, wherein each of said information sets of communication capabilities of said different data terminals collected in the collecting step includes information identifying at least a connection for specifying one of said registered different data terminals, an image resolution, a recording sheet size, encoding/decoding functions.

4. The method of claim 2, further comprising the steps of:

judging whether said facsimile image information to be transmitted has been encoded using an encoding function which is lower grade than said encoding/decoding functions of said stored information set; and converting said facsimile image information to be transmitted using said encoding/decoding functions registered in said memory during said storing step when a result of said judging step determines that said facsimile image information to be transmitted is lower grade.

5. The method of claim 1, wherein said communications controller has a default condition in which said communications controller is normally conditioned to send the information transfer request to a specific data terminal from among said different data terminals in said memory, and can be released from said default condition and be set to a different data terminal when said client data terminal specifies another called data terminal to-send said information transfer request.

6. The method of claim 1, wherein said one of said information sets of communication capabilities pertaining to the called data terminal is used to generate the facsimile image information in a format acceptable to the called data terminal.

7. A client data terminal which is coupled to a local area network, comprising:
   a first communications device that generates facsimile image information by reference to information of communication capabilities of a called data terminal to which said first communications device requests to send such facsimile image information and then performs a standard facsimile communications operation with respect to an information transfer request for requesting a transmission of said facsimile image information to an arbitrary facsimile machine connected to a public switched telephone network, said called data terminal being one of a plurality of different data terminals coupled to said local area network and said public switched telephone network;
   a memory; and
   a second communications device that performs at an arbitrary time the standard communications operation with at least one of said plurality of different data terminals to receive information sets of communication capabilities of said at least one of said plurality of different data terminals and stores such information into said memory, that performs the standard facsimile communications operation with said first communications device to send from said memory one of said information sets of communication capabilities which pertain to said called data terminal, and that performs the standard facsimile communications operation with said first communications device to receive said information transfer request, and that performs the standard facsimile communications operation, using said information transfer request received from said first communications device, with said called data terminal through said local area network after completing the standard facsimile communications operation with said first communications device, said second communications device being operatively connected to said first communications device and to said plurality of different data terminals via said local area network,
   wherein said first communications device generates the facsimile image in accordance with said information of communication capabilities of said called data terminal, in order for the facsimile image to have facsimile image properties which are acceptable to the called data terminal.

8. The client data terminal of claim 7, wherein said second communications device controls said standard facsimile communications operation with said first communications device to perform throughout a plurality of facsimile communications steps which are defined as phases A through to E in accordance with a Group 3 facsimile communications procedure.

9. The client data terminal of claim 7, wherein said information transfer request includes a telephone number of said arbitrary facsimile machine, said facsimile image information to be transmitted, property information of said facsimile image information, and identification information identifying said called data terminal.

10. The client data terminal of claim 7, wherein each of said information sets of communication capabilities of said different data terminals sent from said first communications device to said second communications device includes information identifying at least a connection for specifying one of said registered different data terminals, an image resolution, a recording sheet size, encoding/decoding functions.

11. The client data terminal of claim 7, wherein said second communications device can convert said information transfer request sent from said first communications device, using said encoding/decoding functions registered in said memory as the information of communication capabilities of said called data terminal, when an encoding function used by said first communications device for conversion of said information transfer request is lower grade than said registered encoding/decoding functions.

12. The client data terminal of claim 7, wherein said first communications device has a default condition, in which said first communications device is normally conditioned to send the information transfer request to a specific data terminal from among said different data terminals registered in said memory, and can be released from said default condition and be set to another different data terminal when said first communications device specifies another called data terminal.

13. The client data terminal of claim 7, wherein said information of communication capabilities of the called data terminal is used to generate the facsimile image information in a format acceptable to the called data terminal.

14. A client data terminal which is coupled to a local area network, comprising:
   first communications means for generating facsimile image information by reference to information of communication capabilities of a called data terminal to which said first communications device requests to send such facsimile image information and then performs a standard facsimile communications operation with respect to an information transfer request for requesting a transmission of said facsimile image information to an arbitrary facsimile machine connected to a public switched telephone network, said called data terminal being one of a plurality of different data terminals coupled to said local area network and said public switched telephone network;
   memory means; and
   second communications means for performing at an arbitrary time the standard communications operation with at least one of said plurality of different data terminals to receive information sets of communication capabilities of said at least one of said plurality of different data terminals and stores such information into said memory means, performing the standard facsimile communications operation with said first communications means to send from said memory means one of said information sets of communication capabilities which pertain to said called data terminal, and performing the standard facsimile communications operation with said first communications means to receive said information transfer request, and performing the standard facsimile communications operation, using said information transfer request received from said first communications means, with said called data terminal through said local area network after completing the standard facsimile communications operation with said first communications means, said second communications means being operatively connected to said first communications means and to said plurality of different data terminals via said local area network, wherein said first communications means generates the facsimile image in accordance with said information of communication capabilities of said called data terminal, in order for the facsimile image to have facsimile image properties which are acceptable to the called data terminal.

15. The client data terminal of claim 14, wherein said second communications means controls said standard facsimile communications operation with said first communications means to perform throughout a plurality of facsimile communications steps which are defined as phases A through to E in accordance with a Group 3 facsimile communications procedure.

16. The client data terminal of claim 14, wherein said information transfer request includes a telephone number of said arbitrary facsimile machine, said facsimile image information to be transmitted, property information of said facsimile image information, and identification information identifying said called data terminal.

17. The client data terminal of claim 14, wherein each of said information sets of communication capabilities of said different data terminals sent from said first communications means to said second communications means includes information identifying at least a connection for specifying one of said registered different data terminals, an image resolution, a recording sheet size, encoding/decoding functions.

18. The client data terminal of claim 14, wherein said second communications means can convert said information transfer request sent from said first communications means, using said encoding/decoding functions registered in said memory means as the information of communication capabilities of said called data terminal, when an encoding function used by said first communications means for conversion of said information transfer request is lower grade than said registered encoding/decoding functions.

19. The client data terminal of claim 14, wherein said first communications means has a default condition, in which said first communications means is normally conditioned to send the information transfer request to a specific data terminal from among said different data terminals registered in said memory means, and can be released from said default condition and be set to another different data terminal when said first communications means specifies another called data terminal.

20. The client data terminal of claim 14, wherein said information of communication capabilities of the called data terminal is used to generate the facsimile image information in a format acceptable to the called data terminal.

* * * * *